Figure 1:
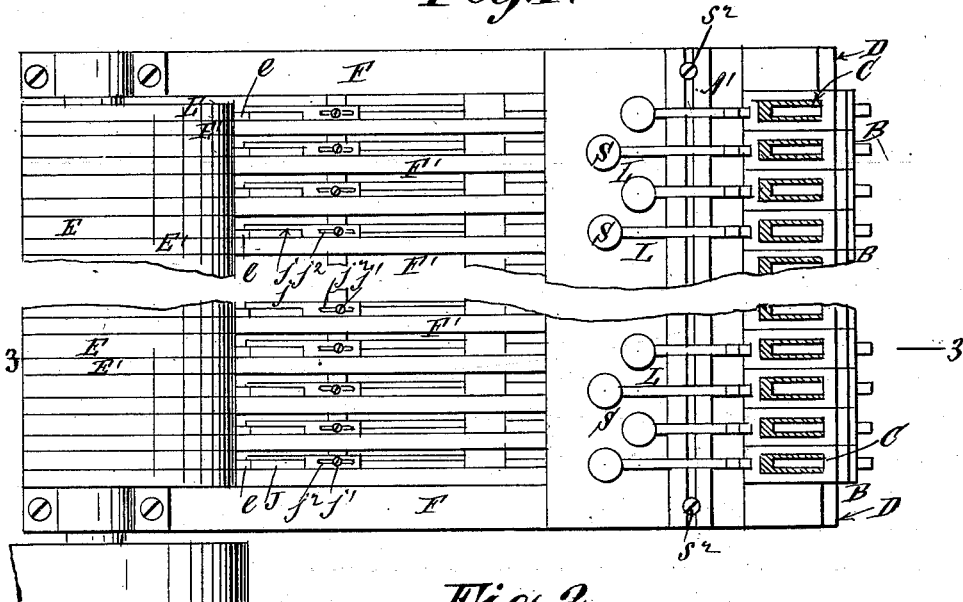

No. 657,546. Patented Sept. 11, 1900.
L. K. JOHNSON & A. A. LOW.
TYPE SETTING APPARATUS.
(Application filed Jan. 4, 1899.)

(No Model.) 4 Sheets—Sheet 1.

Witnesses:
D. W. Gardner
L. Miatt.

Inventors:
Louis Kossuth Johnson
Abbot Augustus Low
By their Attorney
George William Miatt No. 657,546. Patented Sept. 11, 1900.
L. K. JOHNSON & A. A. LOW.
TYPE SETTING APPARATUS.
(Application filed Jan. 4, 1899.)
(No Model.) 4 Sheets—Sheet 2.
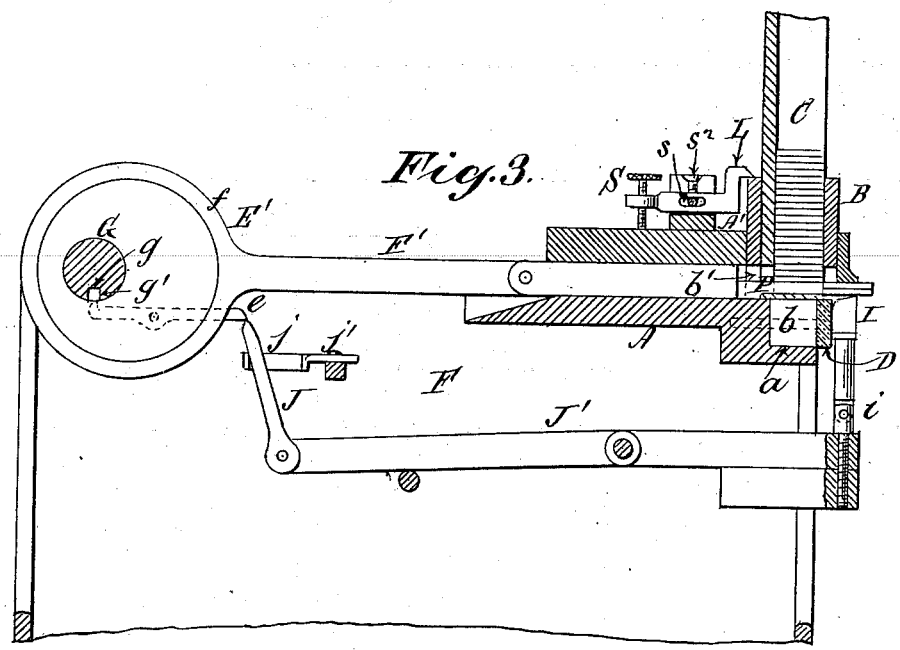
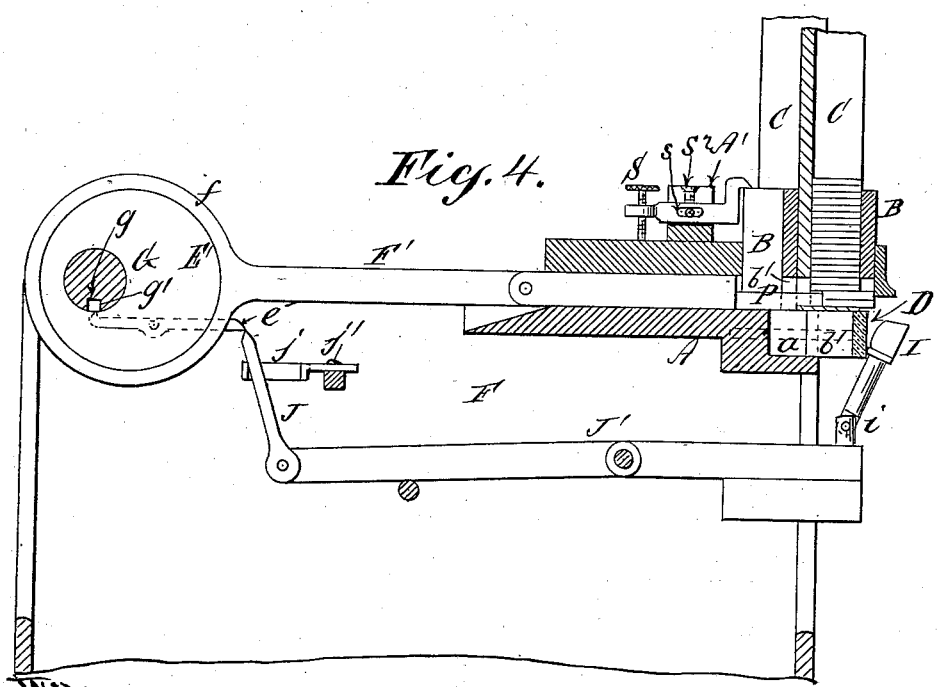
Witnesses:
D. W. Gardner.
L. Miatt.
Inventors:
Louis Kossuth Johnson
Abbot Augustus Low
By their attorney
George William Miatt
THE NORRIS PETERS CO., PHOTO-LITHO., WASHINGTON, D. C.

No. 657,546. Patented Sept. 11, 1900.
L. K. JOHNSON & A. A. LOW.
TYPE SETTING APPARATUS.
(Application filed Jan. 4, 1899.)
(No Model.) 4 Sheets—Sheet 3.
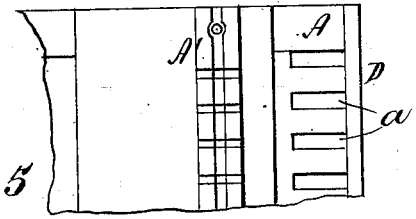
Fig. 5.
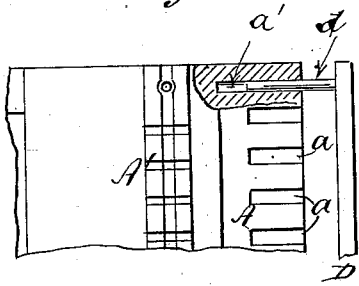
Fig. 6.
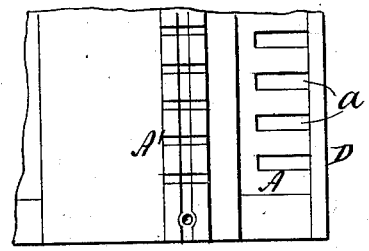
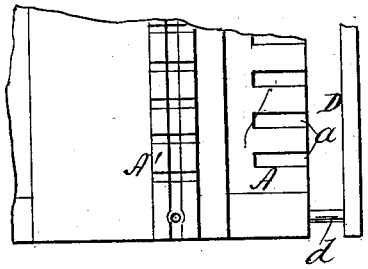
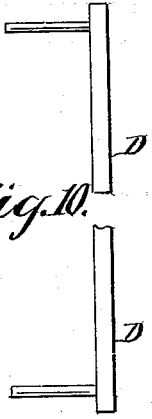
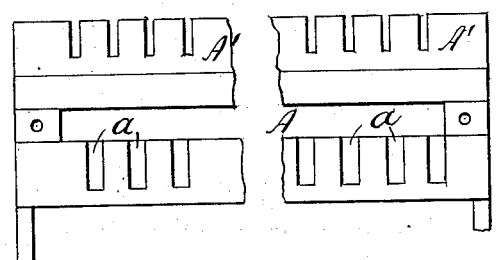
Fig. 7.
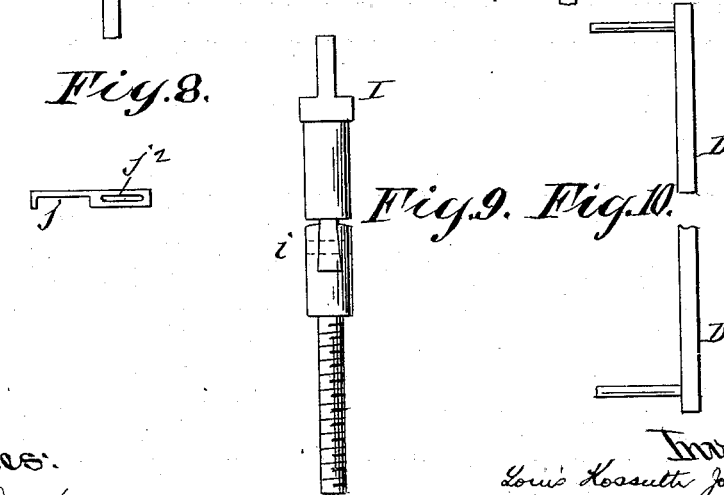
Fig. 8. Fig. 9. Fig. 10.
Witnesses:
D. W. Gardner.
L. Miatt.
Inventors:
Louis Kossuth Johnson
Abbot Augustus Low
By their attorney
George William Miatt

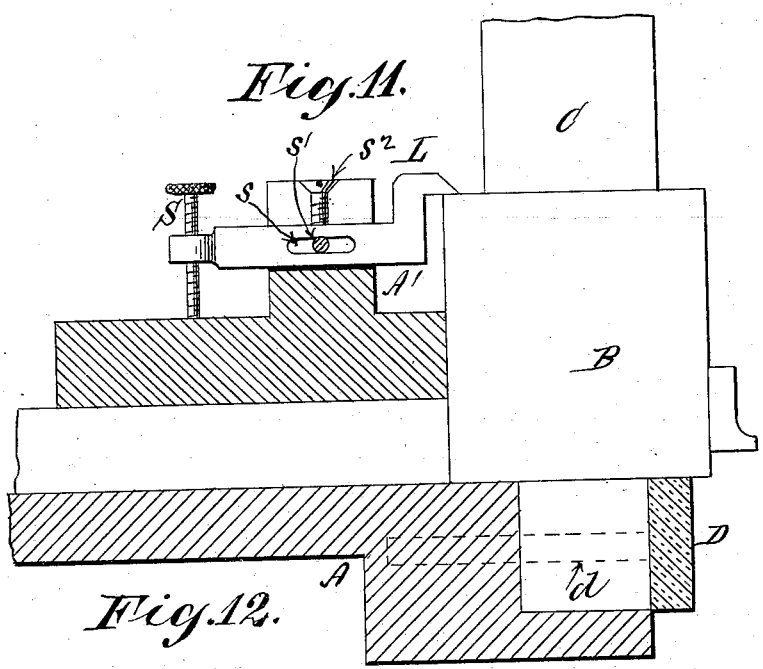
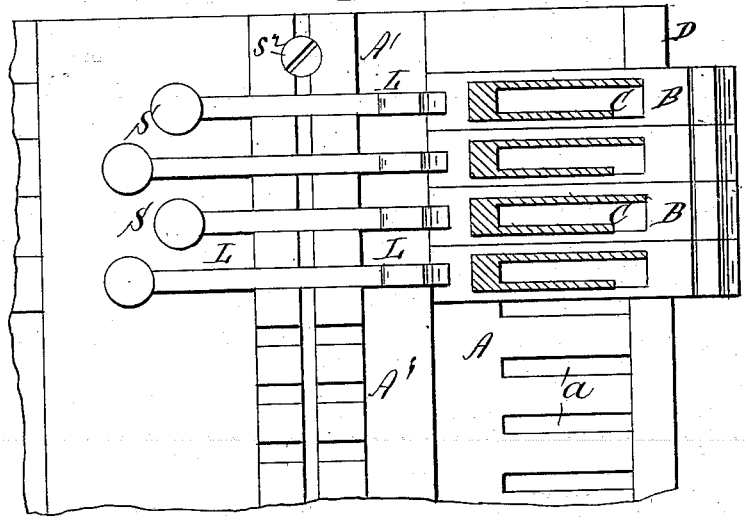
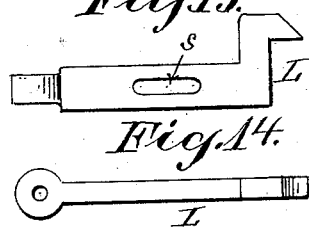
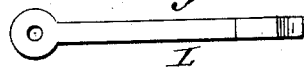

UNITED STATES PATENT OFFICE.

LOUIS KOSSUTH JOHNSON AND ABBOT AUGUSTUS LOW, OF NEW YORK, N. Y., ASSIGNORS TO THE ALDEN TYPE MACHINE COMPANY, OF SAME PLACE.

TYPE-SETTING APPARATUS.

SPECIFICATION forming part of Letters Patent No. 657,546, dated September 11, 1900.

Application filed January 4, 1899. Serial No. 701,124. (No model.)

*To all whom it may concern:*

Be it known that we, LOUIS KOSSUTH JOHNSON and ABBOT AUGUSTUS LOW, citizens of the United States, residing in the city of New York, borough of Brooklyn, in the county of Kings and State of New York, have invented certain new and useful Improvements in Type-Setting Apparatus, of which the following is a specification sufficient to enable others skilled in the art to which the invention appertains to make and use the same.

Our improvements relate to the class of type-setter cases in which a prescribed number of types are forwarded automatically into position to be removed by hand, the withdrawal of the forwarded types releasing the type-forwarding mechanism, as set forth in our Patent No. 599,390, dated February 22, 1898. In this class of mechanism a positive pusher is used, so that if by accident or otherwise the wrong channel is inserted in the holder there is danger of derangement or breakage. In other words, each holder is set to receive and accommodate a channel in which a prescribed word or combination of types is accommodated. Since the types vary in thickness, it is obvious that if a channel containing another combination or word is inserted in the holder there is likely to be a variation in the total height in the word or combination, the upper member of which will overlap more or less the lower end of the front guard. Under these conditions the forward movement of the pusher will press the face of said type forcibly against the front guard, either stopping the operation of the mechanism or deranging the parts. We overcome this difficulty by, and our present invention consists in, forming the bed of the apparatus with a movable front piece or cap to the sockets formed for the reception of the channel-holder tenons in such manner that in case the pusher encounters undue resistance the channel-holder is free to yield and adapt itself to the requirements of the case, the movable cap still holding and sustaining the channel-holder, substantially as hereinafter set forth. By this means we attain a yielding motion in the line of least resistance—that is to say, parallel to the line of motion of the pusher, thus obviating undue strain or frictional contact between the parts and simplifying the structure.

Another distinguishing feature of our present invention consists in making the finger-piece which bears against the under side of the forwarded types and by which the type-forwarding mechanism is released in such manner that it will yield before the advance of the tenon-cap above named. An incidental feature in this connection consists in providing means for the accurate adjustment of the gravity-latch upon the actuating-lever with relation to the pawl on the clutch mechanism for the purpose of increasing the delicacy of operation of the parts.

Still another feature of our invention consists in the means hereinafter described for locking the channel-holders individually and collectively against vertical movement.

Figure 2:
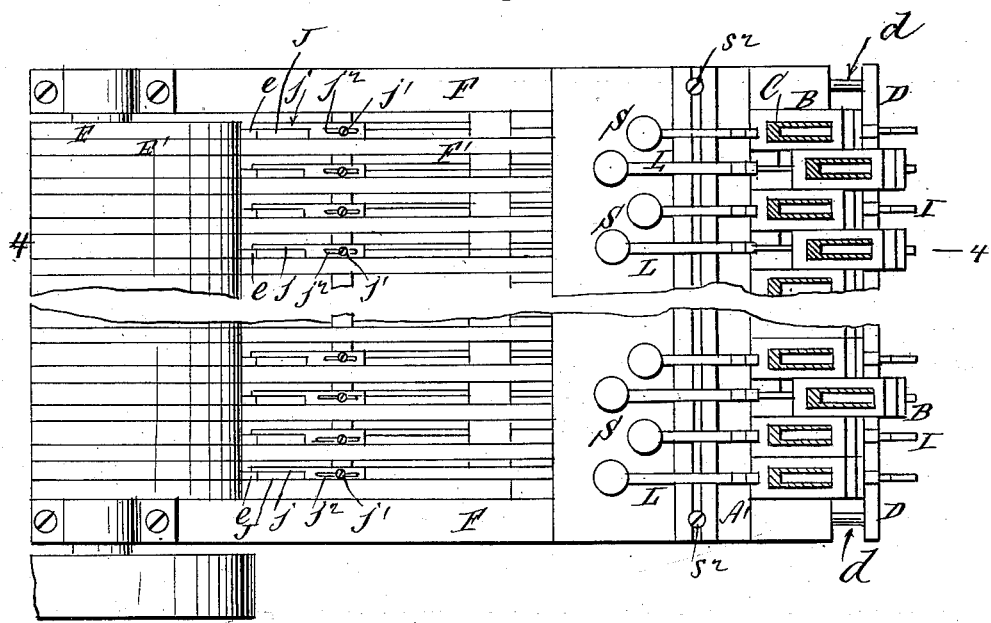

In the accompanying drawings, Figure 1 is a plan of parts of our improved type-case in its normal position. Fig. 2 is a similar view showing three of the channel-holders advanced. Fig. 3 is a section upon plane of line 3 3, Fig. 1. Fig. 4 is a similar section upon plane of line 4 4, Fig. 2. Fig. 5 is a plan of front portions of the bed-plate, showing the tenon-cap in position; and Fig. 6, a similar view showing the tenon-cap advanced. Fig. 7 is a front view of the table or bed, the central portion being broken away. Fig. 8 is a detail of the adjustable rest for the gravity-latch. Fig. 9 is a detail view of the finger-piece. Fig. 10 is a detail view of opposite ends of the tenon-cap. Fig. 11 is a sectional elevation, upon an enlarged scale, showing the means for retaining the channel-holder in position. Fig. 12 is a plan of the parts shown in Fig. 11. Figs. 13 and 14 are detail views of one of the channel-holder bolts.

In the drawings the bed-plate A is formed with sockets or recesses $a$ (open in front) for the reception of the tenons $b$ of the channel-holders B. The channel-holder B is formed with a slot $b'$ in its rear wall for the reception of the type-forwarder P, which also enters a slot formed in the spine of the type-containing channel C.

To the front of the bed-plate A is mounted the movable front cap D, which closes the recesses a and confines the tenons b under normal conditions.

It will be seen by reference to Fig. 4 that when a type or types in the containing-channels other than those of a prescribed thickness encounter the lower end of the channel-holder B the forward movement of the type-forwarder P tends to move the channel-holder and type-containing channel forward, the tenon b encountering the movable cap D, which is free to yield under any undue pressure, thereby avoiding breakage of the apparatus and injury to the types.

A series of bolts L are mounted upon the frame of the apparatus for engagement with the top of the rear walls of the channel-holders B. These locking-bolts L are provided with locking-screws S, which bear upon the frame of the apparatus and may be loosened or tightened individually to retain the channel-holders against movement in a vertical direction. The bolts are formed with slots s, through which the fulcrum-bar s' passes to hold them in position. These slots allow of the accurate adjustment of the bolts with relation to the channel-holders. Set-screws $s^2 s^2$ may be used for holding the bar s' in position in the cross member A' of the frame.

Between the side members of the frame F of the apparatus is the shaft G, which has mounted loosely upon it a series of clutches E, similar to those heretofore described and claimed by us, one clutch being provided for each type-forwarder P. The shaft G is formed with a longitudinal groove g, thereby affording a shoulder for engagement with any of the several pawls e, mounted upon the clutch-disks E', said disks being eccentrics encircled by the straps f of the pitmen F', to the forward end of which the horizontal pusher-blade P is pivoted. The shaft G is in constant rotation, so that directly the pawl e is released it encounters and engages with the shoulder g', and thereby carries the eccentric E' around with the shaft until the pawl e is again released, which is at the end of a single rotation. To insure the accurate adjustment of the gravity-latch J with relation to the clutch-pawl e, we provide an adjustable rest j, which supports the latch J when the actuating-lever J' is at rest. This adjustment may be effected by any suitable mechanical expedient, as by the set-screw j', passing through the slot $j^2$ of the rest j and entering a stationary part of the apparatus.

The finger-piece l is in the present case formed with a joint i to enable it to yield before the advance of the cap D' whenever necessary. The parts composing the joint are made to fit so closely that the finger-piece l will retain its upright normal position by frictional contact alone.

The cap D is held in position by the dowels d d, which fit in the sockets a', formed in the bed-plate A. These dowels d d fit closely in the sockets a', so as to afford a slight frictional resistance when the cap D is withdrawn.

What we claim as our invention, and desire to secure by Letters Patent, is—

1. In type-setting apparatus substantially such as described, the combination with the bed formed with the recesses for the reception of the tenon of the channel-holders, said channel-holders and a yielding bar or cap for closing the fronts of the said recesses, substantially in the manner and for the purpose described.

2. In type-setting apparatus substantially such as described, the combination of the bed formed with recesses for the reception of the tenons of the channel-holders, said channel-holders, a yielding cap for closing the front of said tenon-recesses and confining the tenons therein and type-forwarding mechanism arranged and operating substantially in the manner and for the purpose described.

3. In type-setting apparatus substantially such as described, the combination of the table A, formed with the recesses a, the channel-holders B, the retaining-cap D, formed with the dowels d, fitting in the sockets a', and suitable forwarding mechanism arranged and operating, substantially in the manner and for the purpose described.

4. In type-setting apparatus substantially such as herein described, the combination with type-forwarding mechanism, channel-holders, and a yielding cap for closing the recesses in which the tenons of the channel-holders rest, of type-fingers upon the actuating-levers jointed so as to adapt themselves to the position of the said yielding cap, substantially in the manner and for the purpose described.

5. In type-setting apparatus substantially such as described, the combination of the table A, formed with the recesses a, the channel-holders B, the retaining-cap C', formed with the dowels d, fitting in the sockets a', suitable type-forwarding mechanism, the bolts L, formed with the slots s, the fulcrum-bar s', the set-screws $s^2$, and the locking-screws S, the whole arranged and operating substantially as set forth.

LOUIS KOSSUTH JOHNSON.
ABBOT AUGUSTUS LOW.

Witnesses:
D. W. GARDNER,
GEO. WM. MIATT.